United States Patent
Bannai et al.

(10) Patent No.: US 7,118,831 B2
(45) Date of Patent: Oct. 10, 2006

(54) NONAQUEOUS ELECTROLYTE CELL

(75) Inventors: Yutaka Bannai, Tokyo (JP); Hironori Yamamoto, Tokyo (JP); Mariko Miyachi, Tokyo (JP); Ikiko Yamazaki, Tokyo (JP); Koji Utsugi, Tokyo (JP); Jiro Iriyama, Tokyo (JP); Tamaki Miura, Tokyo (JP); Mitsuhiro Mori, Tokyo (JP); Hidemasa Kawai, Tokyo (JP)

(73) Assignee: NEC Corporation, Toyko (JP)

( * ) Notice: Subject to any disclaimer, the term of this patent is extended or adjusted under 35 U.S.C. 154(b) by 65 days.

(21) Appl. No.: 10/503,956

(22) PCT Filed: Apr. 9, 2003

(86) PCT No.: PCT/JP03/04484

§ 371 (c)(1), (2), (4) Date: Aug. 9, 2004

(87) PCT Pub. No.: WO03/085756

PCT Pub. Date: Oct. 16, 2003

(65) Prior Publication Data

US 2005/0089757 A1    Apr. 28, 2005

(30) Foreign Application Priority Data

Apr. 10, 2002 (JP) .............................. 2002-107921

(51) Int. Cl.
*H01M 4/58* (2006.01)
(52) U.S. Cl. ............................. 429/231.95; 429/218.1; 429/231.8
(58) Field of Classification Search ........... 429/231.95, 429/218.1, 231.8, 210; 252/182.1; 427/123; 204/192.15
See application file for complete search history.

(56) References Cited

U.S. PATENT DOCUMENTS

2004/0175621 A1 *  9/2004  Iriyama et al. ........ 429/231.95

FOREIGN PATENT DOCUMENTS

| JP | 6-283157 A | 10/1994 |
|---|---|---|
| JP | 7-296798 A | 11/1995 |
| JP | 7-326342 A | 12/1995 |
| JP | 8-102333 A | 4/1996 |
| JP | 10-112307 A | 4/1998 |
| JP | 2000-21392 A | 1/2000 |
| JP | 2001-15172 A | 1/2001 |
| JP | 2001-283833 A | 10/2001 |
| JP | 2002-15729 A | 1/2002 |
| JP | 2002-237295 A | 8/2002 |
| JP | 2002-358954 A | 12/2002 |
| JP | 2003-115293 A | 4/2003 |
| JP | 2003-123740 A | 4/2003 |

* cited by examiner

*Primary Examiner*—Michael Barr
*Assistant Examiner*—Monique Wills
(74) *Attorney, Agent, or Firm*—Sughrue Mion, PLLC

(57) ABSTRACT

An anode with a multi-layer structure including a first layer (21) having carbon as a main component, and a second layer (22) having lithium-ion conductivity and including a material as a main component thereof which can insert and extract lithium ions, or a multi-layer structure including a third layer (23) containing lithium in addition to the first layer and the second layer, and a lithium secondary battery including the same. The lithium secondary battery can be provided in which the battery capacity is substantially enhanced in the voltage range where the battery is actually used while maintaining the higher charge-discharge efficiency and the excellent cycle performance.

8 Claims, 3 Drawing Sheets

NONAQUEOUS ELECTROLYTE CELL

TECHNICAL FIELD

The present invention relates to a secondary battery, and more specifically to a lithium secondary battery and a method of fabricating the secondary battery.

BACKGROUND ART

The widespread use of mobile terminals such as a cellular phone and a notebook-size personal computer recognizes the importance of secondary batteries acting as their power sources. These secondary batteries are required to be compact, light and high in their capacities, and to have performance hardly deteriorated after the repetition of the charging and discharging.

Although metal lithium may be used as the anode of the secondary battery in view of its higher energy density and lightness, a problem arises that needle crystals (dendrite) are deposited on the lithium surface of the metal lithium anode during the charging in the progress of the charge-discharge cycle, and the crystals penetrate the separator to cause the internal short-circuit, thereby shortening the battery life.

Further, use of lithium alloy having a composition formula of $Li_xM$ ("M" is metal such as Al) as an anode is investigated. A problem also arises that pulverization of the anode is caused with the progress of the charge-discharge cycle thereby shortening the battery life because the lithium metal anode is swollen and contracted with the insertion and extraction of the lithium ion though it has a larger volume for the lithium ion insertion and extraction per a unit volume and thus has a larger capacity.

When a carbon material such as graphite and hard carbon capable of inserting and extracting the lithium ion is used as the anode, the energy density becomes lower because the graphite material has a lower capacity than the metal lithium and the lithium alloy, and the hard carbon has a larger irreversible capacity on the initial charging and discharging to decrease the charge-discharge efficiency though the charge-discharge cycle is excellent.

A number of investigations have been conducted for the purpose of improving the anode.

JP-A-2000-21392 discloses the electric contact between an anode containing a carbon material and metal such as Si, Ge and Sn or its oxide, and metal lithium during the fabrication of the battery to propose the improvement of the anti-over discharge performance and the cycle performance.

JP-A-11(1999)-135120 discloses use of a carbon material coated with particles made of Al, Sn or Sb as an anode to propose the improvement of the higher capacity, the higher voltage and the cycle performance.

JP-A-10(1998)-21964 discloses use of a material mainly containing chalcogen compounds having Al, Sn or Si or its oxide as an anode to propose the higher capacity, the elevation of the cycle performance and the improvement of the production efficiency.

JP-A-2000-182602 discloses a secondary battery anode including an anode sheet made of an amorphous oxide capable of inserting and extracting lithium and laminated with a metal foil mainly made of lithium to propose the higher capacity and the improvement of the anti-over discharge performance.

JP-A-2001-15172 discloses a secondary battery anode including an anode sheet made of a carbon material laminated with a metal foil mainly made of lithium to propose the higher capacity and the improvement of the charge-discharge efficiency.

However, these prior arts cause the following problems.

The techniques described in JP-A-2000-21392, JP-A-11(1999)-135120 and JP-A-10(1998)-21964 can hardly increase the energy densities of the batteries sufficiently high because the metals and the metal oxides have the higher irreversible capacities on the initial charging and discharging and the larger anode weights. When the metal is mixed with the carbon-based material, the operating voltage becomes lower compared with an anode made of only carbon, and the higher operating voltage can be hardly obtained because a voltage plateau which is typical to the metal appears on a discharge curve at a voltage higher than that of carbon so that the higher operating voltage can be hardly obtained. The lower limit voltages are fixed depending on uses in the lithium secondary battery. The decrease of the operating voltage narrows the usable region so that the capacity increase in the region where the battery is actually used can be hardly intended.

In the method described in JP-A-2000-21392, the added lithium is reacted with active functional groups on the carbon surface, adsorbed water on the carbon surface or moisture contained in the solvent or the electrolyte to form a film on the anode surface. The lithium contained in the film is electrochemically inactive and cannot contribute to the charge-discharge capacity so that the improvement of the charge-discharge efficiency is insufficient. The electric resistances of the films are large to increase the resistance of the battery so that the effective capacity of the battery rather decreases.

In both of the anode sheet made of the amorphous material and the anode sheet made of the carbon material in the methods described in JP-A-2000-182602 and JP-A-2001-15172, a bonding agent of the electrode is in direct contact with the lithium metal foil so that the bonding agent reacts with part of the lithium metal foil to form a highly resistant film.

Further, in the amorphous material sheet, the metal distribution inevitably becomes non-uniform in the microscopic scale resulting in the generation of the local concentration of the electric field. Because of these reasons, it is difficult to maintain the cycle performance at a higher level.

The following descriptions can be found in the above publications with respect to electrolytes. An electrolyte prepared by dissolving 0.4 weight part of $LiBF_4$ and 12.1 weight part of $LiPF_6$ into a mixed solvent composed of 65.5 weight part of diethyl carbonate and 22 weight part of ethylene carbonate is described in JP-A-2000-21392; an electrolyte prepared by dissolving 1 mol/liter of $LiPF_6$ into a mixed solvent composed of ethylene carbonate and dimethyl carbonate in a volume ratio of 1:1 is described in JP-A-11(1999)-135120; an electrolyte prepared by dissolving 1 mol/liter of $LiPF_6$ into a mixed solvent composed of ethylene carbonate and diethyl carbonate in a volume ratio of 2:8 is described in JP-A-10(1998)-21964; an electrolyte prepared by dissolving 0.4 g of $LiBF_4$ and 12.1 g of $LiPF_6$ into a mixed solvent composed of 65.3 g of diethyl carbonate and 22.2 g of ethylene carbonate is described in JP-A-2000-182602; and an electrolyte prepared by dissolving 0.4 g of $LiBF_4$ and 12.1 g of $LiPF_6$ into a mixed solvent composed of 65.3 g of diethyl carbonate and 22.2 g of ethylene carbonate followed by further dissolution of an adding agent such as 1,2-bis(ethoxycarbonyl)-1,2-dimethylhydrazine is described in JP-A-2001-15172. These electrolytes are described in the respective examples of the publications. Further, various solvents are cited and described to be used as an electrolyte in the bodies of the specifications.

However, the detailed review with respect to the optimum value and range regarding the solvent composition of the electrolyte, the volume ratio for mixing and the lithium salt concentration is not provided.

DISCLOSURE OF INVENTION

In view of the above problems possessed by the prior art, an object of the present invention is to provide a lithium secondary battery having a substantially elevated battery capacity in a voltage range in which the battery is actually used while maintaining a higher charge-discharge efficiency and an excellent cycle performance.

The present invention provides a lithium secondary battery including (i) a cathode including a lithium-containing composite oxide, (ii) an anode with a multi-layer structure including a first layer (21) having carbon as a main component, and a second layer (22) with lithium-ion conductivity having a material as a main component which can insert and extract lithium ion, and (iii) a non-aqueous electrolyte composed of a mixed solvent including a first non-aqueous solvent having a specific dielectric constant of 30 or more and a viscosity of 1 cP or more and a second non-aqueous solvent having a specific dielectric constant of 10 or less and a viscosity below 1 cP in a volume ratio from 2:8 to 6:4, and dissolving therein a lithium salt in a range from 0.5 to 1.5 mol/liter; and a lithium secondary battery including (i) a cathode including a lithium-containing composite oxide, (ii) an anode with a multi-layer structure including a first layer having carbon as a main component, a second layer with lithium-ion conductivity having a material as a main component which can insert and exract lithium ion, and a third layer which contains lithium and is not in direct contact with the first layer, and (iii) a non-aqueous electrolyte composed of a mixed solvent including a first non-aqueous solvent having a specific dielectric constant of 30 or more and a viscosity of 1 cP or more and a second non-aqueous solvent having a specific dielectric constant of −10 or less and a viscosity below 1 cP in a volume ratio from 2:8 to 6:4, and dissolving therein a lithium salt in a range from 0.5 to 1.5 mol/liter.

The present invention will be described in detail.

As described in the prior art, it is conjectured that the compatibility of the higher amount of the lithium insertion and extraction and the higher charge-discharge efficiency can be theoretically possible by using the anode prepared by combining the carbon material for anode and the material having the larger amount of the lithium insertion and extraction such as the metal oxide. It is further considered that the advance addition of the metal lithium by an amount equal to the irreversible capacity of the anode to the carbon material for anode reduces the irreversible capacity of the battery to increase its energy density. However, in reality, the mere combination of these materials can hardly increase the energy density of the battery as mentioned in the section of the prior art.

Accordingly, in the present invention, the multi-layer structure is used as the anode structure including the first layer having the carbon as the main component, and (a) the second layer with the lithium-ion conductivity having the material as the main component which can insert and exract the lithium ion; or (b) the above second layer, and the third layer which contains the lithium or a lithium-containing compound and is not in direct contact with the first layer. That is, the layer having the carbon as the main component and the other layer having a material other than carbon as the main component and inserting and extracting the lithium ion are formed in the respective multi-layer structures.

In the secondary battery of the present invention having the above configuration, the uniform presence of the active substance on the anode achieved by using the filmy material uniformizes the electric field distribution between the cathode and the anode. Therefore, the local concentration of the electric field hardly takes place, and the stable battery performance can be obtained without occurrence of fractures such as peeling-off of the active substance from a current collector. When the electric field distribution is non-uniform, the lithium-inserting layer may be locally swollen to cause the deterioration of the battery performance. Impurities such as a bonding agent may react with the metal lithium to form the highly resistive film to worsen the battery performance. The anode of the present invention using the filmy material can solves these problems.

In case of the embodiment (b) including the third layer, the second layer between the first layer and the third layer suppresses the direct reaction between the active sites on the carbon anode surface and the metal lithium so as to exert the added lithium to effectively compensate the irreversible capacity of the carbon anode. Further, a part of the added lithium is doped into the material with the lithium ion conductivity thereby increasing the lithium ion concentration. The increase of the number of the electronic charged carriers in the filmy material further elevates the lithium ion conductivity so that the battery resistance can be reduced to further increase the effective capacity of the battery.

An anode for a lithium secondary battery can be also provided which is equipped with a region containing lithium an amount of which is larger than the theoretical composition under the fully charged state.

When the anode having the second layer disposed between the first layer and the third layer is charged, a part of the lithium forming the third layer is doped into the second layer. The phenomenon is utilized to dope the lithium which exceeds the saturated amount into the second layer under the fully charged state without consuming the lithium contained in the cathode to provide the anode having the second layer doped with the lithium.

When the charging and the discharging are repeated on the multi-layer anode including the first to third layers, the lithium contained in the third layer is doped into the first layer and the second layer, and the third layer gradually disappears. During this step, the second layer containing the lithium is generated. The anode having the second layer which contains the lithium itself contributes to the realization of the battery having the excellent performance in the viewpoint different from that of the three-layer structure.

The lithium secondary battery generated in this manner enables the increase of the effective capacity of the battery because the film having the larger electric resistance is not formed, different from the prior art in which the metal lithium is in electric contact with the anode during the battery fabrication.

The structure formed by stacking the carbon-containing layer and the lithium-containing layer can realize a higher lithium-inserting amount by taking the advantages of the both layers without forming dendrite.

However, as described in the section of the prior art, the problem in connection with the decrease of the battery performance arises in the structure in which the carbon layer is in direct contact with the lithium layer because the lithium reacts with the carbon on the interface to form the highly insulative film. Although the problem can be alleviated by replacing the lithium layer with a lithium-alloy layer, the lithium in the lithium-alloy layer also reacts with the carbon layer to decrease the battery performance after all.

The second layer of the present invention in connection with the lithium secondary battery including the third layer originally has the lithium ion conductivity, and the doping of the lithium by means of the charging and the discharging further elevates the lithium ion conductivity. The above film having the higher lithium ion conductivity never hinders the charge-discharge reaction, and rather acts as a protective film to suppress the side reaction between the electrolyte and the active substance, thereby improving the battery performance. The filmy second layer superposed on the first layer containing the carbon as the main component, and the filmy third layer superposed on the second layer suppress the intercalation between the carbon layers under the situation where the lithium ion is solvated, thereby preventing the deterioration of the carbon layers to attain the improvement of the cycle performance.

However, on the other hand, when only a non-aqueous solvent having a specific dielectric constant of 30 or more and a viscosity of 1 cP or more is used as an electrolyte solvent, the dispositions of the filmy second layer on the first layer containing the carbon as the main component and of the filmy third layer on the second layer hardly impregnate the electrolyte having the higher viscosity to the first layer, thereby increasing the resistance at the electrode interface so that the sufficient battery performance cannot be extracted. Further, when only a non-aqueous solvent having a specific dielectric constant of 10 or less and a viscosity less than 1 cP is used as an electrolyte solvent, the dissolution of the lithium salt is insufficient due to the lower specific dielectric constant though the solvent easily reaches to the first layer. Accordingly, the lack of the ionic conductivity of the electrolyte increases the internal resistance of the battery so that the sufficient battery performance cannot be extracted.

The investigations of the present inventors have revealed that the impregnation of the electrolyte and the dissolution of the lithium salt can be consistent with each other in the above-mentioned stacked structure by using a non-aqueous electrolyte composed of a mixed solvent including a first non-aqueous solvent having a specific dielectric constant of 30 or more and a viscosity of 1 cP or more and a second non-aqueous solvent having a specific dielectric constant of 10 or less and a viscosity below 1 cP in a volume ratio from 2:8 to 6:4, and dissolving therein a lithium salt in a range from 0.5 to 1.5 mol/liter. Accordingly, the non-aqueous electrolyte having the above composition is used in the present invention.

As described above, the consistence of the higher charge-discharge efficiency and capacity can be possible and the excellent cycle performance can be also realized in the present invention by applying, as the configuration of the anode, the multi-layer structure including the first layer having the carbon as the main component, and the second layer with the lithium-ion conductivity having the material as the main component which can insert and extract the lithium ion; or the multi-layer structure including the above second layer, and the third layer which contains the lithium or the lithium-containing compound and is not in direct contact with the first layer, and by optimizing the solvent composition of the electrolyte, the mixing volume ratio and the lithium salt concentration for the anode configuration.

The above and other objects, features and advantages of the present invention will be more apparent from the following description.

BEST MODE FOR IMPLEMENTING INVENTION

Figure 1:
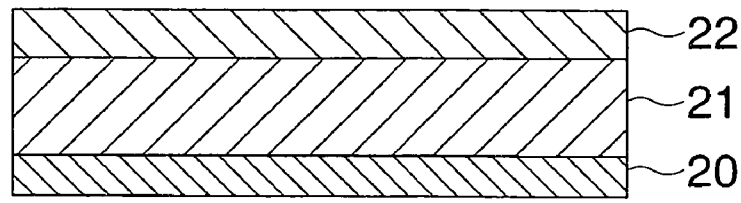
FIG. 1 is a longitudinal sectional view exemplifying a lithium secondary battery anode in accordance with a first embodiment of the present invention.

The shape of the secondary battery of the present invention is not especially restricted and includes, for example, a cylindrical shape, a square shape and a coin shape.

The first, second and third layers of the present invention contain the carbon, the filmy lithium inserting material and the lithium or the lithium-containing material as the main components, respectively, and may further contain an addition agent and so forth. The main component of the present invention refers to a content from more than 50% in weight to 100%. The respective layers may be singular or plural, and the below configurations are not included in principle.

(i) A configuration in which the first layer and the third layer are in direct contact with each other.

(ii) A configuration in which the first layer is disposed on the outermost surface on the anode.

The order of the stacking is arbitrary except for the above configurations. For example, the second and third layers can be disposed on the respective top and bottom surfaces of the first layer to further elevate the battery capacity while maintaining the higher charge-discharge efficiency and the excellent cycle performance.

The second layer of the present invention has the filmy material having the lithium ion conductivity as the main component. The lithium ion conductivity refers to a property in which current flows in a substance with lithium ion as a carrier of an electric charge.

The filmy material refers to, different from a particulate material, a material constituting the film with a nearly uniform composition, and is formed by using, for example, an evaporation method, a CVD method or a sputtering method. For instance, a filmy material prepared by coagulating a particulate material having the lithium ion conductivity with a bonding agent is not included in the present invention.

The second layer is desirably made of the material inserting and extracting the lithium ion in addition to having the above-described lithium conductivity. The material inserting and extracting the lithium ion refers to that taking the lithium into the material, and the taking-in of the lithium includes the formation of alloy and a feature taking the lithium in the structure without forming the alloy with the material.

Further, the second layer is preferably an amorphous structure. Since the doping and the dedoping of the lithium electrochemically to and from the amorphous structure take place at a potential lower than that of a crystalline structure, the battery capacity can be increased while maintaining the higher operating voltage and the higher charge-discharge efficiency. The amorphous of the present invention refers to that having a broad scattering band with a peak from 15 to 40 degree expressed as a "2θ" value in the X-ray diffraction method using CuK α rays.

The amorphous structure is crystallographically more isotropic than the crystalline structure so that the strength against an external stress and the chemical stability are excellent. The second layer is hardly subject to the influence of the expansion and the contraction of the charging and the discharging of the anode, and the stability after the repetition of the charging and the discharging is excellent and the capacity deterioration rarely takes place because the reaction with the electrolyte rarely occurs.

The second layer is preferably formed by the evaporation method, the CVD method or the sputtering method. These film-forming methods provide the amorphous ion-conductive film uniformly on the anode. The film uniformizes the electric field distribution between the cathode and the anode. Accordingly, no local concentration of the electric field takes place, and the stable battery performance can be obtained without occurrence of fractures such as peeling-off of the active substance from the current collector.

The material forming the second layer of the present invention is not especially restricted provided that it has the lithium ion conductivity and inserts and extracts the lithium ion, and is preferably contains one or more elements or their oxides selected from the group consisting of Si, Ge, In, Sn and Pb. The selection of the above material having the amorphous structure can increase the battery capacity while maintaining the higher operating voltage and the higher charge-discharge efficiency, and the fabrication becomes easier. Especially, Si, Sn and their oxides can provide the excellent cycle performance because of the small structural change after the insertion of the lithium and little deterioration after the repetition of the charging and the discharging.

The material forming the third layer of the present invention is not especially restricted provided that it is the lithium or the lithium-containing compound, and is preferably the metal lithium, the lithium alloy, lithium nitride, $Li_{3-x}M_xN$ (M=Co, Ni, Cu) or their mixture. Such the material can compensate the irreversible capacity of the anode to elevate the charge-discharge efficiency because the material can electrochemically extract much lithium.

The third layer is preferably made of a material having an amorphous structure. The amorphous structure is crystallographically more isotropic than the crystalline structure so that the strength against an external stress and the chemical stability are excellent, and the amorphous structure hardly reacts with the electrolyte to take place a side reaction. Accordingly, the lithium contained in the third layer is efficiently utilized to compensate the irreversible capacity of the anode. The third layer is preferably formed by the evaporation method, the CVD method or the sputtering method. These film-forming methods can provide the uniform amorphous layer on the entire anode. A side reaction hardly takes place because the use of a solvent is not required, and a purer layer can be formed. The lithium contained in the third layer is efficiently utilized to compensate the irreversible capacity of the anode.

Figure 2:
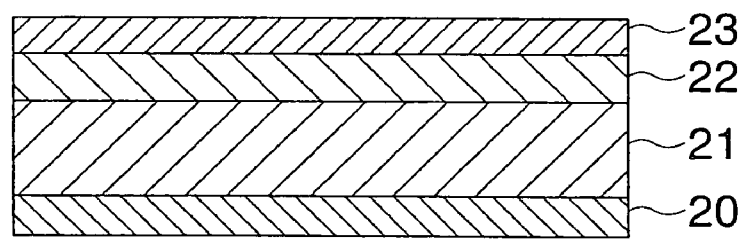
FIG. 2 is a longitudinal sectional view exemplifying a lithium secondary battery anode in accordance with a second embodiment of the present invention.

FIG. 1 is a longitudinal sectional view exemplifying a lithium secondary battery anode having a multi-layer structure in accordance with a first embodiment of the present invention, and FIG. 2 is a longitudinal sectional view exemplifying a lithium secondary battery anode having a multi-layer structure in accordance with a second embodiment of the present invention.

FIG. 1 exemplifies the anode having the multi-layer structure including a first layer (21) having carbon as a main component, and a second layer (22) with lithium-ion conductivity having a material as a main component which can insert and extract lithium ion, sequentially stacked on an anode current collector (20). FIG. 2 exemplifies the anode having the multi-layer structure including the first layer (21) having the carbon as the main component, the second layer (22) with the lithium-ion conductivity having the material as the main component which can insert and extract the lithium ion, and further a third layer (23) made of lithium or a lithium-containing material sequentially stacked on the anode current collector (20), and the first layer (21) and the third layer (23) are not in direct contact with each other.

The current collector (20) is an electrode which takes the current out of the battery and takes the current into the battery during the discharging and the charging, respectively. The current collector (20) may be an electro-conductive foil made of metal such as aluminum, copper, stainless steel, gold, tungsten and molybdenum.

The first layer (21) is the carbon anode layer inserting and extracting the lithium during the charging and the discharging, respectively. The carbon anode (21) is made of the carbon which can insert the lithium, and graphite, amorphous carbon, fullerene, carbon nanotube, DLC or their mixture can be used.

The anode second layer (22) having the lithium ion conductivity is made of the material which can insert and extract the lithium ion. Such the material includes boron oxide, phosphorous oxide, aluminum oxide and their composite oxide in addition to the above-described Si, Ge, In, Sn, Pb and their oxides, and one or more of these materials can be used singly or in combination. Lithium halide or lithium chalcogenide may be added thereto to increase the lithium ion conductivity.

The materials are preferably amorphous as described above. The use of the amorphous material can reduce the potentials for the doping and the dedoping of the lithium compared with the crystal, thereby resulting in the increase of the operating voltage of the battery. As mentioned before, the anode second layer (22) is preferably formed by using the CVD method, the evaporation method or the sputtering method. The use of these methods can form the amorphous layer with a uniform film property and uniform thickness. The anode second layer (22) can be doped with B, P, As or Sb to decrease its resistivity.

The anode third layer (23) is made of the lithium or the lithium-containing compound. Such a material includes metal lithium, lithium alloy, lithium nitride, $Li_{3-x}M_xN$ (M=Co, Ni, Cu) and their mixture, and one or more of these materials can be used singly or in combination. The material is preferably amorphous. The use of the amorphous material suppresses the side reaction with the electrolyte to utilize the lithium contained in the material for the effective compensation of the irreversible capacity. As a result, the initial charge-discharge efficiency of the battery is elevated to increase the energy density. The anode third layer (23) is preferably formed by using the CVD method, the evaporation method or the sputtering method. The use of these methods can form the amorphous layer with a uniform film property and uniform thickness.

Figure 3:
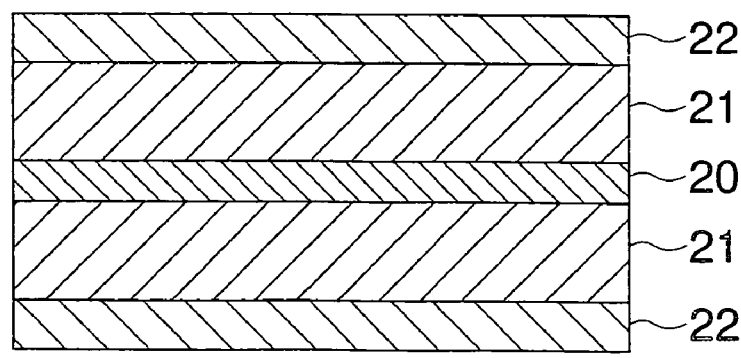
FIG. 3 is a longitudinal sectional view exemplifying a lithium secondary battery anode in accordance with a third embodiment of the present invention.
Figure 4:
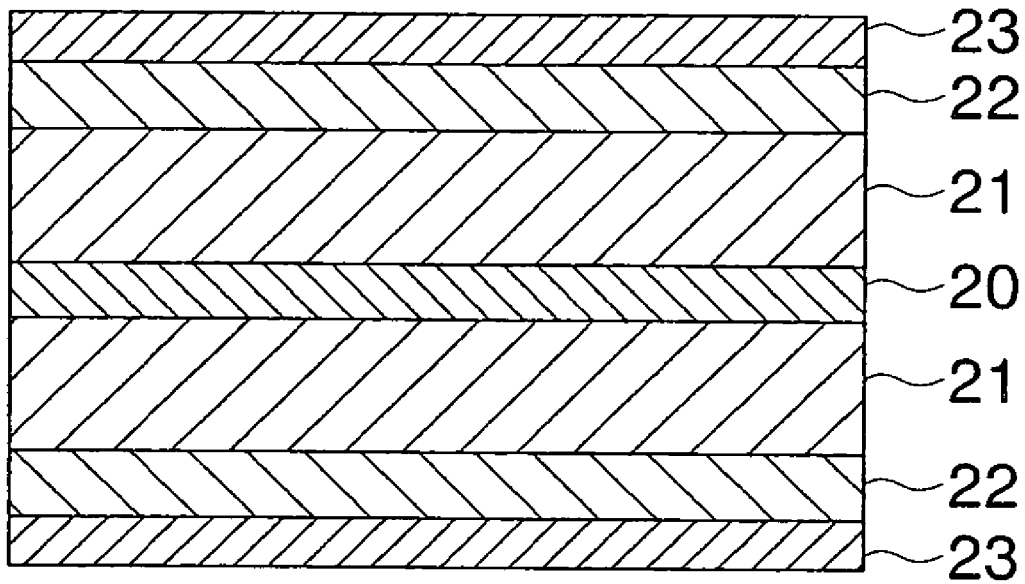
FIG. 4 is a longitudinal sectional view exemplifying a lithium secondary battery anode in accordance with a fourth embodiment of the present invention.

FIG. 3 is a longitudinal sectional view exemplifying a lithium secondary battery anode in accordance with a third embodiment of the present invention, and FIG. 4 is a longitudinal sectional view exemplifying a lithium secondary battery anode having a multi-layer structure in accordance with a fourth embodiment of the present invention.

The embodiment of FIG. 3 similar to the first embodiment shown in FIG. 1 is a structure in which anode first layers (21) made of carbon and anode second layers (22) are sequentially stacked on both surfaces of a current collector (20). The embodiment of FIG. 4 similar to the second embodiment shown in FIG. 2 is a structure in which anode first layers (21) made of carbon, anode second layers (22) and anode third layers (23) are sequentially stacked on both surfaces of a current collector (20).

Figure 5:
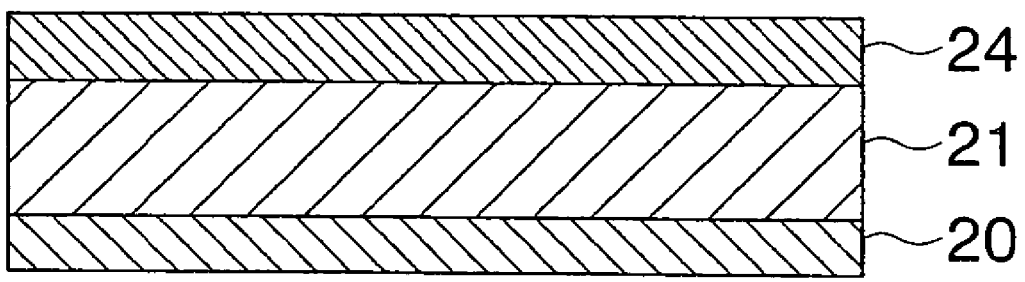
FIG. 5 is a longitudinal sectional view exemplifying a lithium secondary battery anode in accordance with a fifth embodiment of the present invention.

FIG. 5 is a longitudinal sectional view exemplifying a lithium secondary battery anode having a multi-layer structure in accordance with a fifth embodiment of the present invention. In the embodiment, an anode first layer (21) is formed on a current collector (20), and a saturated lithium layer (24) is formed thereon. In the saturated lithium layer (24), a region containing lithium which exceeds the saturated amount in a fully charged state or a region containing the lithium in excess of the theoretical composition is formed. The saturated amount (the theoretical composition) of the lithium refers to the maximum value of the lithium containable in a compound which is generated by a substance and the lithium. The saturated lithium layer (24) corresponds to the anode second layers (22) of the first to fourth embodiments and is included in the present invention.

The lithium saturated amounts of various lithium alloys are described in, for example, "Denshi Zairyo" (April issue, 2001, vol.20, No.4, page 78, published on Apr. 1, 2001; published by Kogyo Chosakai Publishing Co., Ltd.). The below-described values are the upper limits of the lithium alloy compositions, and alloys containing the lithium exceeding these composition ratios are not obtainable by using an ordinary method of fabricating alloy.

LiSi alloy: $Li_4Si$
LiAl alloy: LiAl
LiSn alloy: $Li_{4.4}Sn$
LiCd alloy: $Li_3Cd$
LiSb alloy: $Li_3Sb$
LiPb alloy: $Li_{4.4}Pb$
LiZn alloy: LiZn
LiBi alloy: $Li_3Bi$ The anode of FIG. 5 includes the saturated lithium layer (24) containing the lithium compound having the saturated amount of the lithium. The lithium compound can be obtained by conducting the charging and the discharging of the anode having the structure shown in FIG. 2 under specified conditions. Although the saturated lithium layer (24) is exemplified to be uniformly formed on the anode first layer (21) made of the carbon in FIG. 5, another structure in which a lithium-containing layer is formed on the saturated lithium layer (24) is also included in the present invention.

As described above, the electrolyte of the present invention is the non-aqueous electrolyte composed of the mixed solvent composed of the first non-aqueous solvent and the second non-aqueous solvent in the volume ratio from 2:8 to 6:4, and dissolving therein the lithium salt in the range from 0.5 mol/liter to 1.5 mol/liter. When the ratio of the first non-aqueous solvent is below 2, the specific dielectric constant of the mixed solvent is lower to make the dissociation insufficient resulting in the lack of the ionic conductivity of the electrolyte. The lack of the conductivity increases the internal resistance of the battery not to sufficiently draw out the battery performance. When the ratio of the first non-aqueous solvent exceeds 6, the viscosity of the electrolyte becomes higher to hardly achieve the penetration of the electrolyte to the first layer, thereby increasing the electrode interface resistance not to sufficiently draw out the battery performance. The lithium salt concentration out of the above region lacks the electro-conductivity of the electrolyte, thereby increasing the internal resistance of the battery not to sufficiently draw out the battery performance. The especially preferable mixed volume ratio between the first non-aqueous solvent and the second non-aqueous solvent is from 3:7 to 5:5, and the especially preferable concentration of the lithium salt is from 0.8 mol/liter to 1.2 mol/liter.

Ethylene carbonate, propylene carbonate and butylene carbonate are exemplified as the first non-aqueous solvent of the present invention, and 1,2-dimethoxyethane, dimethyl carbonate, methylethyl carbonate and diethyl carbonate are exemplified as the second non-aqueous solvent.

As the lithium salt of the present invention, $LiBF_4$, $LiPF_6$, LiCl, LiBr, LiI, $LiN(CF_3SO_2)_2$ and $LiN(C_2F_5SO_2)_2$ are exemplified.

The cathode of the present invention can be used which is prepared by applying, on a substrate such as an aluminum foil, a mixture formed by dispersing a lithium-containing composite oxide having a formula of $Li_xMO_2$ (M is at least one transition metal) such as $Li_xCoO_2$, $Li_xNiO_2$, $Li_xMn_2O_4$, $Li_xMnO_3$ and $Li_xNi_yC_{1-y}O_2$, an electro-conductive substance such as carbon black, and a bonding agent such as poly-fluorinated vinylidene in a solvent such as N-methyl-2-pyrrolidone.

As a separator of the present invention, polyolefin such as polypropylene and polyethylene, and a porous film such as fluorocarbon resin can be used.

Figure 6:
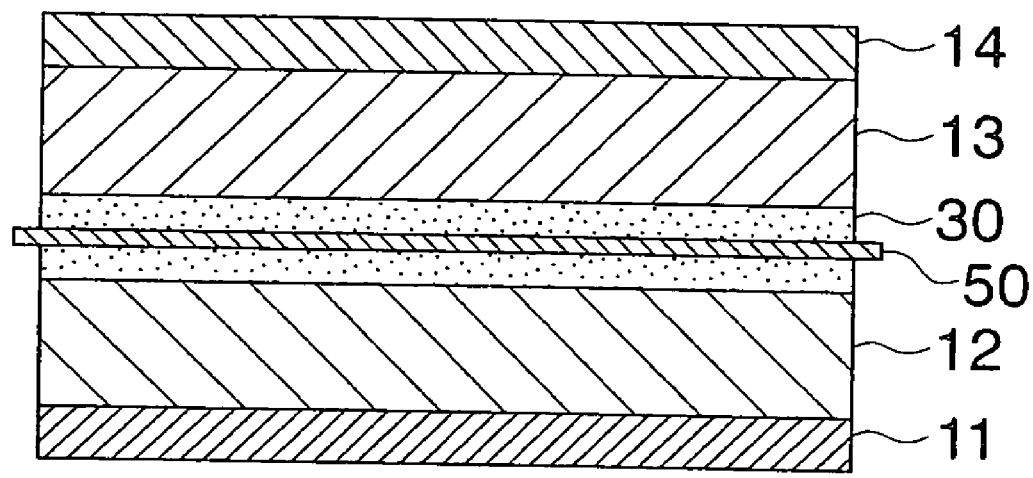
FIG. 6 is a sectional view exemplifying the structure of the secondary battery of the present invention.

FIG. 6 is a sectional view exemplifying the structure of the secondary battery of the present invention. In the drawing, the cathode is fabricated by forming a cathode active substance-containing layer (12) on a cathode current collector (11), and an anode is fabricated by forming an anode active substance-containing layer (13) on an anode current collector (14). The cathode and the anode are opposed to each other sandwiching an electrolyte (30) and a porous separator (50) in the electrolyte (30). The porous separator (50) is disposed nearly parallel to the anode active substance-containing layer (13).

EXAMPLES

Although the present invention will be hereinafter described more in detail by showing Examples, the present invention is not restricted to these Examples unless departing from the gist thereof.

[Fabrication Example of Cathode Sheet]

A cathode sheet was fabricated by applying slurry prepared by dispersing and mixing $Li_{1.1}Mn_2O_4$, a conductivity supplying agent and poly-fluorinated vinylidene in N-methyl-2-pyrrolidone, on an aluminum foil having thickness of 20 μm and acting as a cathode current collector (11) followed by drying. The cathode sheet after the drying was compressed by using a pressing machine.

[Fabrication Example of Anode First Layer]

An anode first layer was fabricated by applying slurry prepared by dispersing and mixing graphite powders, a conductivity supplying agent and poly-fluorinated vinylidene in N-methyl-2-pyrrolidone, on a copper foil having thickness of 10 μm and acting an anode current collector (20) followed by drying.

The anode first layer after the drying was compressed by using a pressing machine.

[First Fabrication Example of Anode Second Layer]

A Si layer acting as an anode second layer was formed on the anode first layer fabricated in the Fabrication Example of Anode First Layer by using a vacuum-deposition method to provide an anode sheet having a stacked structure including the anode current collector, the anode first layer and the anode second layer in this turn.

[Second Fabrication Example of Anode Second Layer]

A Si layer acting as an anode second layer was formed on the anode first layer fabricated in the Fabrication Example of Anode First Layer by using a sputtering method to provide an anode sheet having a stacked structure including the anode current collector, the anode first layer and the anode second layer in this turn.

[Third Fabrication Example of Anode Second Layer]

A boron oxide layer acting as an anode second layer was formed on the anode first layer fabricated in the Fabrication Example of Anode First Layer by using a vacuum-deposition method to provide an anode sheet having a stacked structure including the anode current collector, the anode first layer and the anode second layer in this turn.

[First Fabrication Example of Anode Third Layer]

A metal lithium layer acting as an anode third layer was formed on the anode second layer of the anode sheet fabricated in the First Fabrication Example of Anode Second Layer by using a vacuum-deposition method to provide an anode sheet having a stacked structure including the anode current collector, the anode first layer, the anode second layer and the anode third layer in this turn.

[Second Fabrication Example of Anode Third Layer]

A metal lithium layer acting as an anode third layer was formed on the anode second layer of the anode sheet fabricated in the Second Fabrication Example of Anode Second Layer by using a vacuum-deposition method to provide an anode sheet having a stacked structure including the anode current collector, the anode first layer, the anode second layer and the anode third layer in this turn.

[Third Fabrication Example of Anode Third Layer]

A metal lithium layer acting as an anode third layer was formed on the anode second layer of the anode sheet fabricated in the Fabrication Example of Anode Second Layer-3 by using a vacuum-deposition method to provide an anode sheet having a stacked structure including the anode current collector, the anode first layer, the anode second layer and the anode third layer in this turn.

[First Comparable Example of Fabricating Anode Sheet]

Figure 7:
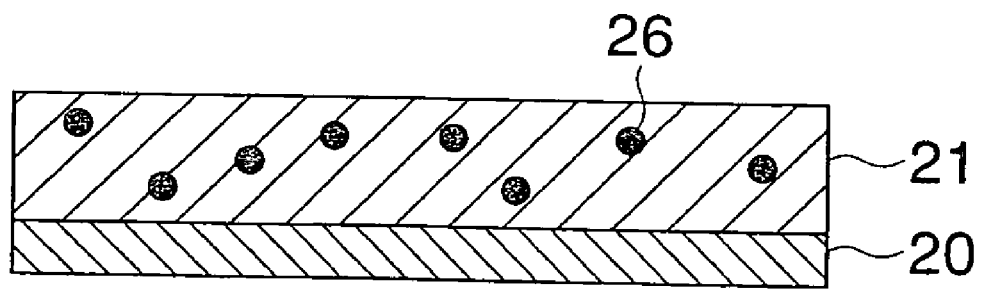
FIG. 7 is a view showing one example of a sectional structure of an anode of Comparative Example.

An anode sheet for Comparable Example shown in FIG. 7 and formed by covering an anode current collector (20) with a first layer (21) containing dispersed Si powders (26) was fabricated by applying slurry prepared by dispersing and mixing graphite powders, Si powders, a conductivity supplying agent and poly-fluorinated vinylidene in N-methyl-2-pyrrolidone, on a copper foil having thickness of 10 μm and acting as an anode current collector (20) followed by drying. The anode sheet for Comparable Example after the drying was compressed by using a pressing machine.

[Second Comparable Example of Fabricating Anode Sheet]

A metal lithium layer was formed on the anode first layer fabricated in the Fabrication Example of Anode First Layer by using a vacuum-deposition method to provide an anode sheet for Comparative Example having a stacked structure including the anode current collector, the anode first layer and the metal lithium layer in this turn.

Example 1

A battery having a structure exemplified in FIG. 6 was fabricated by stacking the anode sheet fabricated in the First Fabrication Example of Anode Second Layer, a separator made of polypropylene non-woven fabric and the cathode sheet fabricated in the Fabrication Example of Cathode Sheet. An electrolyte used was prepared by dissolving 1.0 mol/liter of $LiPF_6$ in a mixed solvent composed of ethylene carbonate and diethyl carbonate (mixed volume ratio is 3:7).

Example 2

A battery was fabricated under the same conditions as those of Example 1 except that the anode sheet fabricated in Second Fabrication Example of Anode Second Layer was used in the anode.

Example 3

A battery was fabricated under the same conditions as those of Example 1 except that the anode sheet fabricated in Third Fabrication Example of Anode Second Layer was used in the anode.

Example 4

A battery was fabricated under the same conditions as those of Example 1 except that a mixed solvent composed of ethylene carbonate and diethyl carbonate (mixed volume ratio is 2:8) into which 1.0 mol/liter of $LiPF_6$ was dissolved was used.

Example 5

A battery was fabricated under the same conditions as those of Example 1 except that a mixed solvent composed of ethylene carbonate and diethyl carbonate (mixed volume ratio is 6:4) into which 1.0 mol/liter of $LiPF_6$ was dissolved was used.

Example 6

A battery was fabricated under the same conditions as those of Example 1 except that a mixed solvent composed of ethylene carbonate and diethyl carbonate (mixed volume ratio is 3:7) into which 0.5 mol/liter of $LiPF_6$ was dissolved was used.

Example 7

A battery was fabricated under the same conditions as those of Example 1 except that a mixed solvent composed of ethylene carbonate and diethyl carbonate (mixed volume ratio is 3:7) into which 1.5 mol/liter of $LiPF_6$ was dissolved was used.

Example 8

A battery was fabricated under the same conditions as those of Example 1 except that a mixed solvent composed of ethylene carbonate and dimethyl carbonate (mixed volume ratio is 3:7) into which 1.0 mol/liter of $LiPF_6$ was dissolved was used.

Example 9

A battery was fabricated under the same conditions as those of Example 1 except that a mixed solvent composed of ethylene carbonate, diethyl carbonate and methylethyl carbonate (mixed volume ratio is 3:5:2) into which 1.0 mol/liter of $LiPF_6$ was dissolved was used.

Example 10

A battery was fabricated under the same conditions as those of Example 1 except that a mixed solvent composed of ethylene carbonate, diethyl carbonate and methylethyl carbonate (mixed volume ratio is 3:2:5) into which 1.0 mol/liter of $LiPF_6$ was dissolved was used.

Example 11

A battery was fabricated under the same conditions as those of Example 1 except that a mixed solvent composed of ethylene carbonate, propylene carbonate and diethyl carbonate (mixed volume ratio is 30:5:65) into which 1.0 mol/liter of $LiPF_6$ was dissolved was used.

Example 12

A battery was fabricated under the same conditions as those of Example 1 except that a mixed solvent composed of ethylene carbonate and diethyl carbonate (mixed volume ratio is 3:7) into which 1.0 mol/liter of $LiN(C_2F_5SO_2)_2$ was dissolved was used.

Example 13

A battery was fabricated under the same conditions as those of Example 1 except that the anode sheet fabricated in First Fabrication Example of Anode Third Layer was used in the anode.

Example 14

A battery was fabricated under the same conditions as those of Example 13 except that the anode sheet fabricated in Second Fabrication Example of Anode Third Layer was used in the anode.

Example 15

A battery was fabricated under the same conditions as those of Example 13 except that the anode sheet fabricated in Third Fabrication Example of Anode Third Layer was used in the anode.

Example 16

A battery was fabricated under the same conditions as those of Example 13 except that a mixed solvent composed of ethylene carbonate and diethyl carbonate (mixed volume ratio is 2:8) into which 1.0 mol/liter of $LiPF_6$ was dissolved was used.

Example 17

A battery was fabricated under the same conditions as those of Example 13 except that a mixed solvent composed of ethylene carbonate and diethyl carbonate (mixed volume ratio is 6:4) into which 1.0 mol/liter of $LiPF_6$ was dissolved was used.

Example 18

A battery was fabricated under the same conditions as those of Example 13 except that a mixed solvent composed of ethylene carbonate and diethyl carbonate (mixed volume ratio is 3:7) into which 0.5 mol/liter of $LiPF_6$ was dissolved was used.

Example 19

A battery was fabricated under the same conditions as those of Example 13 except that a mixed solvent composed of ethylene carbonate and diethyl carbonate (mixed volume ratio is 3:7) into which 1.5 mol/liter of $LiPF_6$ was dissolved was used.

Example 20

A battery was fabricated under the same conditions as those of Example 13 except that a mixed solvent composed of ethylene carbonate and dimethyl carbonate (mixed volume ratio is 3:7) into which 1.0 mol/liter of $LiPF_6$ was dissolved was used.

Example 21

A battery was fabricated under the same conditions as those of Example 13 except that a mixed solvent composed of ethylene carbonate, diethyl carbonate and methylethyl carbonate (mixed volume ratio is 3:5:2) into which 1.0 mol/liter of $LiPF_6$ was dissolved was used.

Example 22

A battery was fabricated under the same conditions as those of Example 13 except that a mixed solvent composed of ethylene carbonate, diethyl carbonate and methylethyl carbonate (mixed volume ratio is 3:2:5) into which 1.0 mol/liter of $LiPF_6$ was dissolved was used.

Example 23

A battery was fabricated under the same conditions as those of Example 13 except that a mixed solvent composed of ethylene carbonate, propylene carbonate and diethyl carbonate (mixed volume ratio is 30:5:65) into which 1.0 mol/liter of $LiPF_6$ was dissolved was used.

Example 24

A battery was fabricated under the same conditions as those of Example 13 except that a mixed solvent composed of ethylene carbonate and diethyl carbonate (mixed volume ratio is 3:7) into which 1.0 mol/liter of $LiN(C_2F_5SO_2)_2$ was dissolved was used.

Comparative Example 1

A battery was fabricated under the same conditions as those of Example 1 except that the anode sheet fabricated in Fabrication Example of Anode First Layer was used in the anode.

Comparative Example 2

A battery was fabricated under the same conditions as those of Example 1 except that the anode sheet fabricated in First Comparable Example of Fabricating Anode Sheet was used in the anode.

Comparative Example 3

A battery was fabricated under the same conditions as those of Example 1 except that the anode sheet fabricated in Second Comparable Example of Fabricating Anode Sheet was used in the anode.

Comparative Example 4

A battery was fabricated under the same conditions as those of Example 1 except that a mixed solvent composed of ethylene carbonate and propylene carbonate (mixed volume ratio is 1:1) into which 1.0 mol/liter of $LiPF_6$ was dissolved was used.

Comparative Example 5

A battery was fabricated under the same conditions as those of Example 1 except that a mixed solvent composed of ethylene carbonate and diethyl carbonate (mixed volume ratio is 1:9) into which 1.0 mol/liter of $LiPF_6$ was dissolved was used.

Comparative Example 6

A battery was fabricated under the same conditions as those of Example 1 except that a mixed solvent composed of ethylene carbonate and diethyl carbonate (mixed volume ratio is 7:3) into which 1.0 mol/liter of $LiPF_6$ was dissolved was used.

Comparative Example 7

A battery was fabricated under the same conditions as those of Example 1 except that a mixed solvent composed of ethylene carbonate and diethyl carbonate (mixed volume ratio is 3:7) into which 0.4 mol/liter of $LiPF_6$ was dissolved was used.

Comparative Example 8

A battery was fabricated under the same conditions as those of Example 1 except that a mixed solvent composed of ethylene carbonate and diethyl carbonate (mixed volume ratio is 3:7) into which 1.6 mol/liter of $LiPF_6$ was dissolved was used.

Comparative Example 9

A battery was fabricated under the same conditions as those of Example 13 except that a mixed solvent composed of ethylene carbonate and propylene carbonate (mixed volume ratio is 1:1) into which 1.0 mol/liter of $LiPF_6$ was dissolved was used.

Comparative Example 10

A battery was fabricated under the same conditions as those of Example 13 except that a mixed solvent composed of ethylene carbonate and diethyl carbonate (mixed volume ratio is 1:9) into which 1.0 mol/liter of $LiPF_6$ was dissolved was used.

Comparative Example 11

A battery was fabricated under the same conditions as those of Example 13 except that a mixed solvent composed of ethylene carbonate and diethyl carbonate (mixed volume ratio is 7:3) into which 1.0 mol/liter of $LiPF_6$ was dissolved was used.

Comparative Example 12

A battery was fabricated under the same conditions as those of Example 13 except that a mixed solvent composed of ethylene carbonate and diethyl carbonate (mixed volume ratio is 3:7) into which 0.4 mol/liter of $LiPF_6$ was dissolved was used.

Comparative Example 13

A battery was fabricated under the same conditions as those of Example 13 except that a mixed solvent composed of ethylene carbonate and diethyl carbonate (mixed volume ratio is 3:7) into which 1.6 mol/liter of $LiPF_6$ was dissolved was used.

Charge-discharge cycle tests were conducted on the batteries of Examples 1 to 24 and Comparative Examples 1 to 13 at test voltages in a rage of 3.0 to 4.3 V. The results of the initial charge-discharge and the capacity retention rate after 300 cycles with respect to the initial discharging capacity are shown in Table 1 for Examples and in Table 2 for Comparative Examples.

TABLE 1

|  | Initial Charging Capacity (mAh) | Initial Discharging Capacity (mAh) | Charge-Discharge Efficiency (%) | Capacity Retention Rate After 300 Cycles (%) |
| --- | --- | --- | --- | --- |
| Example 1 | 155 | 145 | 93.7 | 89.5 |
| Example 2 | 154 | 144 | 93.6 | 88.6 |
| Example 3 | 151 | 140 | 92.9 | 90.1 |
| Example 4 | 152 | 141 | 92.6 | 87.3 |
| Example 5 | 150 | 139 | 92.8 | 86.9 |
| Example 6 | 149 | 138 | 92.5 | 85.6 |
| Example 7 | 153 | 142 | 93.1 | 87.4 |
| Example 8 | 152 | 142 | 93.3 | 89.1 |
| Example 9 | 154 | 142 | 93.1 | 90.6 |
| Example 10 | 153 | 142 | 92.9 | 89.8 |
| Example 11 | 152 | 142 | 93.6 | 90.0 |
| Example 12 | 154 | 144 | 93.2 | 89.6 |
| Example 13 | 156 | 154 | 98.9 | 90.3 |
| Example 14 | 152 | 149 | 98.3 | 90.0 |
| Example 15 | 153 | 150 | 98.2 | 90.2 |
| Example 16 | 151 | 148 | 98.1 | 88.6 |
| Example 17 | 153 | 150 | 98.3 | 87.7 |
| Example 18 | 150 | 147 | 98.0 | 85.6 |
| Example 19 | 152 | 149 | 98.2 | 88.0 |
| Example 20 | 154 | 152 | 98.7 | 89.8 |
| Example 21 | 155 | 153 | 98.6 | 89.9 |

TABLE 1-continued

|  | Initial Charging Capacity (mAh) | Initial Discharging Capacity (mAh) | Charge-Discharge Efficiency (%) | Capacity Retention Rate After 300 Cycles (%) |
| --- | --- | --- | --- | --- |
| Example 22 | 150 | 148 | 98.4 | 90.2 |
| Example 23 | 156 | 154 | 98.6 | 90.6 |
| Example 24 | 151 | 148 | 98.3 | 88.7 |

TABLE 2

|  | Initial Charging Capacity (mAh) | Initial Discharging Capacity (mAh) | Charge-Discharge Efficiency (%) | Capacity Retention Rate After 300 Cycles (%) |
| --- | --- | --- | --- | --- |
| Comp. Ex. 1 | 152 | 142 | 93.2 | 83.1 |
| Comp. Ex. 2 | 148 | 89 | 60.2 | 32.6 |
| Comp. Ex. 3 | 146 | 106 | 72.6 | 18.5 |
| Comp. Ex. 4 | 86 | 27 | 31.6 | Upto 155 cycles |
| Comp. Ex. 5 | 75 | 22 | 29.6 | Upto 135 cycles |
| Comp. Ex. 6 | 135 | 61 | 45.2 | Upto 178 cycles |
| Comp. Ex. 7 | 122 | 59 | 48.1 | Upto 122 cycles |
| Comp. Ex. 8 | 138 | 113 | 81.6 | 42.3 |
| Comp. Ex. 9 | 77 | 22 | 28.2 | Upto 118 cycles |
| Comp. Ex. 10 | 69 | 18 | 25.5 | Upto 98 cycles |
| Comp. Ex. 11 | 127 | 54 | 42.5 | Upto 138 cycles |
| Comp. Ex. 12 | 116 | 50 | 43.2 | Upto 161 cycles |
| Comp. Ex. 13 | 130 | 103 | 79.5 | 38.5 |

The charge-discharge efficiency of the battery of Comparative Example 1 using only the carbon material as the anode was 93.2%. On the other hand, the charge-discharge efficiencies of the batteries of Examples 1 to 3 forming the anode second layers made of the Si or the born oxide were also around 93%. Accordingly, it is apparent that the latter was not inferior to the former. The charge-discharge efficiencies of the batteries of Examples 13 to 15 forming the anode third layers made of the metal lithium were as high as 98.2% to 98.9% demonstrating that the compensation of the irreversible capacity of the anode by the anode third layer efficiently proceeded. On the other hand, in the battery of Comparative Example 2 in which the Si powders were dispersed in the carbon material and in the battery of Comparative Example 3 in which the metal lithium layer was formed directly on the surface of the carbon material, the charge-discharge efficiencies thereof were 60.2% and 72.6%, respectively, demonstrating that the elevation of the charge-discharge efficiencies could not be implemented by using the configuration dispersing the crystalline material in the carbon material and the configuration forming the lithium layer on the carbon material. Further, in connection with the capacity retention rate after 300 cycles, while the capacities of about 88.6% to 90.3% with respect to the initial discharging capacities were retained in Examples 1 to 3 and 13 to 15, only 32.6% and 18.5% could be retained in Comparative Examples 2 and 3, respectively, demonstrating that the elevation of the charge-discharge efficiencies could not be implemented by using the configurations of Comparative Examples.

The contributing factors seem that the electric contact of the anode layer was lost to increase the resistance by the swelling and the constriction due to the charging and the discharging of the Si powders in Comparative Example 2, and the lithium formed on the carbon material reacted with active sites on the carbon surface to form a highly resistant film in Comparative Example 3.

The results of Examples 1 to 3 and 13 to 15 indicate that the secondary batteries having the anode configurations of the present invention had the higher capacities and charge-discharge efficiencies and the stable cycle performances.

In Examples 1 to 24 in which the compositions of the electrolyte solvents, the mixed volume ratios and the lithium salt concentrations were adjusted in the ranges of the present invention, the initial charge-discharge efficiencies were as high as about 92 to 99%, and the capacity retention rates after 300 cycles were retained at about 85 to 90%. On the other hand, in Comparative Examples 4 to 13 in which the compositions of the electrolyte solvents, the mixed volume ratios and the lithium salt concentrations were out of the ranges of the present invention, the charge-discharge efficiencies of about 80% were retained at the lithium salt concentrations of 1.6 mol/liter (Comparative Examples 8 and 13), but the efficiencies were as bad as about 25 to 48% in the other Comparative Examples. Further, in connection with the cycle performance, the capacities could not be retained after 300 cycles except for Comparative Examples 8 and 13, and even in Comparative Examples 8 and 13, the capacity retention rates were as low as around 40%. The contributing factor seems that the electrode interface resistance or the internal resistance of the battery was increased so that the sufficient battery performance cannot be extracted in the compositions of the electrolyte solvents, the mixed volume ratios and the lithium salt concentrations out of the ranges of the present invention.

The results of Examples 1 to 24 have indicated that the ranges of the composition of the solvent, of the mixed volume ratio and of the lithium salt concentration of the present invention were effective for the anode configuration of the present invention.

Since the above embodiments are described only for examples, the present invention is not limited to the above embodiments and various modifications or alterations can be easily made therefrom by those skilled in the art without departing from the scope of the present invention.

The invention claimed is:

1. A lithium secondary battery comprising:
   (i) a cathode including a lithium-containing composite oxide,
   (ii) an anode having a multi-layer structure including a first layer (21) having carbon as a main component thereof, a second layer (22) having a lithium-ion conductivity and including a material as a main component thereof which can insert and extract lithium ions, and a third layer (23) which contains lithium and is not in direct contact with the first layer (21), and
   (iii) a non-aqueous electrolyte composed of a mixed solvent including a first non-aqueous solvent having a specific dielectric constant of 30 or more and a viscosity of 1 cP or more and a second non-aqueous solvent having a specific dielectric constant of 10 or less and a viscosity below 1 cP in a volume ratio from 2:8 to 6:4, and dissolving therein a lithium salt in a range from 0.5 to 1.5 mol/liter.

2. The lithium secondary battery as defined in claim 1, wherein the second layer (22) includes one or more components selected from the group consisting of Si, Ge, Sn, In, Pd and their oxides.

3. The lithium secondary battery as defined in any one of claims 1 or 2, wherein the second layer (22) includes an amorphous structure formed by an evaporation method, a CVD method or a sputtering method.

4. The lithium secondary battery as defined in any one of claims 1 or 2, wherein the third layer (23) includes one or more materials selected from the group consisting of metal lithium, lithium alloy and lithium nitride.

5. The lithium secondary battery as defined in any one of claims 1 or 2, wherein the third layer (23) includes an amorphous structure formed by an evaporation method, a CVD method or a sputtering method.

6. The lithium secondary battery as defined in any one of claims 1 or 2, wherein the first non-aqueous solvent includes one or more non-aqueous solvents selected from the group consisting of ethylene carbonate, propylene carbonate and butylene carbonate, and the second non-aqueous solvent includes one or more non-aqueous solvents selected from the group consisting of 1,2-dimethoxyethane, dimethyl carbonate, methylethyl carbonate and diethyl carbonate.

7. The lithium secondary battery as defined in any one of claims 1 or 2, wherein the lithium salt includes one or more lithium salts selected from the group consisting of $LiBF_4$, $LiPF_6$, $LiCl$, $LiBr$, $LiI$, $LiN(CF_3SO_2)_2$ and $LiN(C_2F_5SO_2)_2$.

8. A method for fabricating a lithium secondary battery comprising the steps of:

charging and/or discharging an anode of a lithium secondary battery including (i) a cathode having a lithium-containing composite oxide, (ii) the anode having a multi-layer structure including a first layer (21) having carbon as a main component thereof, a second layer (22) having a lithium-ion conductivity and including a material as a main component thereof which can insert and extract lithium ions, and a third layer (23) which contains lithium and is not in direct contact with the first layer (21), and (iii) a non-aqueous electrolyte, thereby doping the lithium contained in the third layer to the second layer to form the second layer containing the lithium.

* * * * *